US010119447B2

(12) United States Patent
Fulcher

(10) Patent No.: US 10,119,447 B2
(45) Date of Patent: Nov. 6, 2018

(54) EXHAUST SYSTEM AND DEVICE TO INDUCE IMPROVED EXHAUST GAS MIXING PRIOR TO TREATMENT THROUGH A CATALYTIC CONVERTER

(71) Applicant: ACAT Global, Charlevoix, MI (US)

(72) Inventor: Eric Fulcher, Clarkston, MI (US)

(73) Assignee: ACAT Global, Charlevoix, MI (US)

( * ) Notice: Subject to any disclaimer, the term of this patent is extended or adjusted under 35 U.S.C. 154(b) by 30 days.

(21) Appl. No.: 15/518,699

(22) PCT Filed: Oct. 15, 2015

(86) PCT No.: PCT/US2015/055711
§ 371 (c)(1),
(2) Date: Apr. 12, 2017

(87) PCT Pub. No.: WO2016/061333
PCT Pub. Date: Apr. 21, 2016

(65) Prior Publication Data
US 2017/0234192 A1 Aug. 17, 2017

Related U.S. Application Data

(60) Provisional application No. 62/064,258, filed on Oct. 15, 2014.

(51) Int. Cl.
F01N 3/00 (2006.01)
F01N 3/28 (2006.01)
F01N 3/20 (2006.01)
F01N 3/021 (2006.01)
B01F 5/06 (2006.01)

(52) U.S. Cl.
CPC .......... *F01N 3/2892* (2013.01); *B01F 5/0643* (2013.01); *F01N 3/021* (2013.01); *F01N 3/208* (2013.01); *F01N 3/2066* (2013.01); *F01N 2560/026* (2013.01); *F01N 2610/02* (2013.01); *F01N 2610/1453* (2013.01); *F01N 2900/1402* (2013.01); *Y02T 10/24* (2013.01)

(58) Field of Classification Search
USPC ......... 60/272, 274, 286, 295, 296, 297, 303, 60/309, 324
See application file for complete search history.

(56) References Cited

U.S. PATENT DOCUMENTS

| | | | |
|---|---|---|---|
| 3,953,176 A | 4/1976 | Santala et al. | |
| 4,049,388 A | 9/1977 | Scheitlin et al. | |
| 4,455,281 A | 6/1984 | Ishida et al. | |
| 4,882,130 A * | 11/1989 | Asai | B01J 19/32 261/112.2 |
| 5,489,153 A * | 2/1996 | Berner | B01F 5/061 366/337 |
| 5,766,559 A | 6/1998 | Blanchet et al. | |

(Continued)

OTHER PUBLICATIONS

International Search Report and Written Opinion dated Jan. 6, 2016, Form PCT/ISA/220, 11 pages.

*Primary Examiner* — Binh Q Tran
(74) *Attorney, Agent, or Firm* — Butzel Long; Gunther J. Evanina

(57) ABSTRACT

An exhaust gas mixer to impart swirl and turbulence in the exhaust stream of an internal combustion engine as well as an exhaust system including such an exhaust gas mixer is disclosed.

5 Claims, 3 Drawing Sheets

(56) References Cited

U.S. PATENT DOCUMENTS

| | | | | |
|---|---|---|---|---|
| 6,553,755 | B2* | 4/2003 | Hofmann | F01N 3/2066 |
| | | | | 423/238 |
| 8,371,114 | B2* | 2/2013 | Hayashi | B01D 53/90 |
| | | | | 60/286 |
| 8,916,104 | B2* | 12/2014 | Lee | B01D 53/8631 |
| | | | | 422/180 |
| 2011/0067386 | A1 | 3/2011 | Gonze et al. | |
| 2015/0267587 | A1* | 9/2015 | Calvo | F01N 3/2066 |
| | | | | 60/301 |

* cited by examiner

EXHAUST SYSTEM AND DEVICE TO INDUCE IMPROVED EXHAUST GAS MIXING PRIOR TO TREATMENT THROUGH A CATALYTIC CONVERTER

CROSS-REFERENCE TO RELATED APPLICATION

This application claims the benefit of and priority to PCT Application No. PCT/US2015/055711, filed Oct. 15, 2015 and U.S. Provisional Patent Application No. 62/064,258 filed on Oct. 15, 2014, which are hereby incorporated by reference in their entireties.

TECHNICAL FIELD

Emission control in exhaust gas is a continuing concern in operation of compression ignition internal combustion engines. There is a constant trade-off between fuel economy and exhaust emissions, namely $NO_x$, hydrocarbons, particulates and soot. Recent air quality regulations have required even more stringent reductions in these emissions. In part for this reason, vehicle and engine manufacturers have created or required exhaust systems that include Selective Catalyst Reducers (SCR) as well as Diesel Particulate Filters (DPF).

In operation, the engine exhaust gas stream flows through an engine exhaust conduit equipped with at least one sensor to detect emissions levels such as, for example, $NO_x$ levels in the exhaust gas stream. The level of exhaust gas emissions, such as, for example $NO_x$, is transmitted to the ECU via a Common Area Network (CAN). The exhaust stream then enters the DPF which reduces hydrocarbons, soot and particulates. When the $NO_x$ sensor signals indicate that $NO_x$ levels in the exhaust gas stream from the DPF outlet exceed acceptable levels, a signal is sent from the ECU to an injector in communication with the DEF supply to inject a predetermined quantity of DEF into the exhaust gas stream. The ammonia in the DEF mixes with the exhaust gas. The exhaust gas stream passes through the SCR where it is catalyzed with the ammonia in the DEF into $N_2$ gas and $2H_2O$, and then emitted from the tailpipe.

DEF is expensive and its use requires operators of heavy duty diesel vehicles to fill auxiliary tanks on the vehicle with the DEF to be used during operation of the engine. There is a need to use the DEF supply more efficiently to minimize engine down time, costs incurred for DEF supply, and reduce the amount of $NO_x$ emissions from the tailpipe of the engine.

SUMMARY

In one aspect, there is disclosed an exhaust system for a compression ignition internal combustion engine which provide for improved mixing of DEF in the exhaust gas stream to promote more efficient use of the DEF and reduce the $NO_x$ emissions of an engine so equipped.

In another aspect there is disclosed a device for inclusion in an exhaust system of a compression ignition internal combustion engine that induces improved turbulence swirl and mixing of exhaust gas and injected DEF in an exhaust gas stream. The swirl and mixing introduced as a result of passing the exhaust gas stream through the novel device reduce consumption of DEF while meeting required standards for $NO_x$ emissions in the exhaust gas outflow of an engine so equipped.

DETAILED DESCRIPTION

Figure 1:
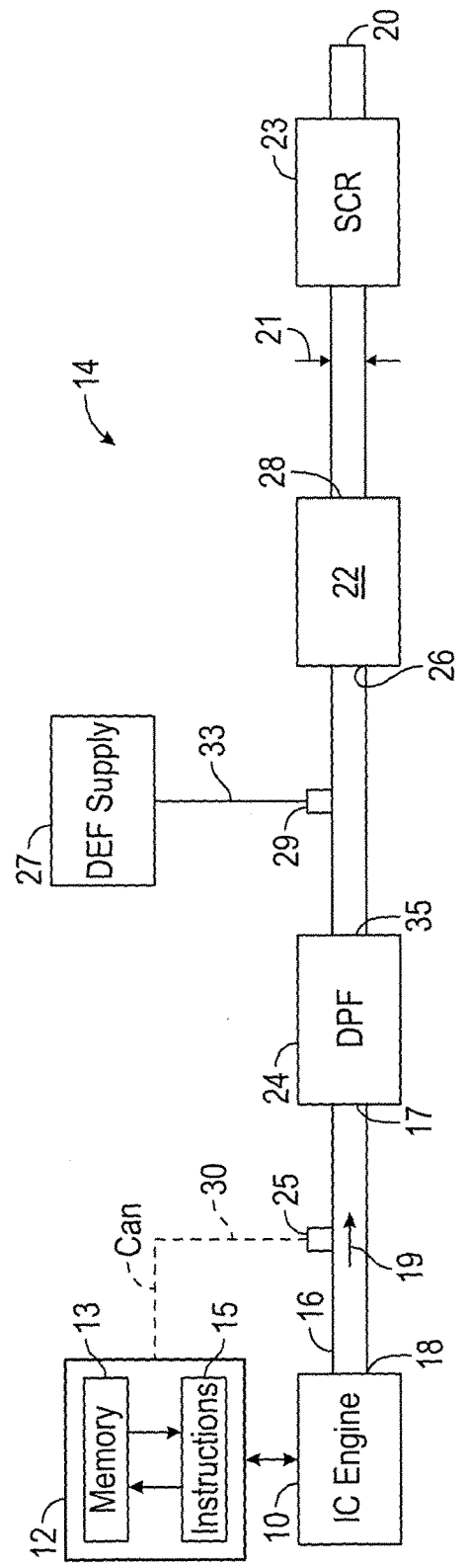
FIG. 1 is a schematic representation of an internal combustion engine with an exhaust system.

Turning now to the drawings wherein like numbers refer to like structures, FIG. 1 is a schematic representation of an internal combustion engine 10, which may be a compression ignition engine, having electronic control unit (ECU) 12 having a memory 13 with operating instructions 15 included therein to operate the engine in a manner understood to those of ordinary skill in the art. The ECU memory may be RAM, ROM, PROM, EPROM EEPROM, FLASH or any other memory. Attendant with those operating instructions there is included in ECU memory are exhaust system instructions which, in response to sensed exhaust gas conditions, operate various aspects of the exhaust system 14. The exhaust system instructions may include tables in memory with levels of $NO_x$ emissions together with amounts/timing of DEF to be injected into the exhaust gas stream commensurate with the level of $NO_x$, or it may contain maps which show $NO_x$ levels and associated DEF injection amounts/timing. In this regard, the exhaust system is shown for a diesel engine, but it is contemplated that any internal combustion engine could utilize an embodiment of the exhaust gas mixer of the instant application.

In one embodiment, exhaust system 14 is comprised of an exhaust gas conduit 16 extending from the engine exhaust output 18 through the exhaust outlet 20 of the exhaust system. The exhaust conduit has an inner diameter 21 of sufficient size to permit the unrestricted flow of exhaust gas from the engine and through the exhaust system. In this example, the exhaust system is equipped with a $NO_x$ exhaust sensor 25, electronically connected to the ECU by a common area network (CAN) 30 or any other electronic system. Sensor 25 senses $NO_x$ levels in the exhaust stream 19 and sends data signals to the ECU indicative of the levels of $NO_x$ in the exhaust stream. The exhaust system also includes a DPF 24 having an inlet 17 and an outlet 35 of substantially the same inner diameter as the inner diameter 21 of the exhaust conduit so that there is unrestricted flow through of the exhaust gas stream through the DPF inlet to the DPF outlet. If, as is in this example, the exhaust system is a diesel exhaust system, there is provided a DEF supply source 27, which may be a tank or other suitable receptacle, fluidly connected at conduit 33 to the exhaust conduit 16 through a DEF injector 29. The DEF supply and injector are positioned upstream from an exhaust gas mixer unit 22, which is positioned upstream from the Selective Catalyst Reactant (SCR) 23. The exhaust gas mixer has an inlet 26 and an outlet 28 of substantially the same inner diameter as inner diameter 21 of the conduit 16. When the $NO_x$ exhaust sensor detects $NO_x$ levels in the exhaust gas stream that exceed a predetermined level as set forth in the exhaust system operating instructions in memory, the ECU directs the injection of a predetermined amount of DEF from the DEF supply 27 through injector 29 into the exhaust stream. The exhaust gas mixer has a configuration, as will be discussed hereinafter, that will impart improved swirl and mixing of the exhaust gas stream and the injected DEF to improve mixing of the DEF with the exhaust stream. The improved mixture of DEF with exhaust gas permits the SCR to more efficiently convert more of the $NO_x$ to $H_2O$ and $N_2$, which results in lower $NO_x$ emissions. The exhaust gas mixer also permits a smaller amount of DEF to be used to achieve the desired reduction in $NO_x$ emissions.

Turning now to FIGS. 2A through 4, the exhaust gas mixer will now be described. Specifically, a body 32 is provided which may be of any shape, and is shown as being tubular. The body has opposed ends 34 and 36 in spaced apart relation to each other, and inner surface 31 and an outer surface 37 extending substantially unbroken therebetween to define an interior 38 that is at least the same interior diameter 40 as the exhaust system so as not to impede the exhaust gas flow stream.

An exhaust gas mixer substrate 42, 45 is provided at each opposed end of the body and are fitted into the interior space of the body. In one example, the exhaust gas substrate has a length 43 that is somewhat less than ½ the length 41 of the body. A sleeve 56 is positioned in the body intermediate the exhaust substrates and secured into place such that a space 57 is formed on either side of the sleeve between the sleeve and the substrate. The sleeve and space create the low pressure zone 49 in the interior of the body. The sleeve may be projection welded or secured in any other manner to hold it in place between the substrates. Thus, it can be understood that the substrates extend from the exhaust gas mixer inlet or the exhaust gas outlet toward each other such that there is a low pressure zone 49 between the substrates to enhance exhaust gas stream draw, from the inlet to the outlet of the exhaust gas mixer. The body is swagged at its ends and fitted with a retainer end ring end ring 58, 60 to hold the substrates in the body. Those skilled in the art understand that the design of the exhaust mixer may change in size ratios of the substrates or sleeve, or the proportions of the various components, depending upon the overall needs of the exhaust system.

The exhaust gas mixer substrates 42, 45 have a herringbone construction 46, and may be circumferentially fitted with a retainer ring 48, 50 at a first or second end thereof to contain the substrate in a compact form for ease of handling and manufacture. It is to be understood however, that the retainer rings are not necessary, and that it is contemplated that the substrate could be fitted directing into the body interior of the mixer without the use of the retainer rings. The exhaust gas substrates are made of a metal or other rigid substrate that is constructed of a continuous corrugated foil metal catalyst having a length and a width that is corrugated and folded into a fan fold configuration to form the herringbone configuration of the substrate as is disclosed in co-pending application PCT/US2015/055440 filed Oct. 14, 2015, which is fully incorporated herein by reference, or it may be made of individual sheets of corrugated metal substrate bonded at their corners and arranged in a herring bone configuration. The substrate may also be made by using a cut-n-stack method or a wound construction. The important aspect of the substrate is herringbone configuration of each substrate relative to each other and to the exhaust gas flow as will now be described.

Figure 2A:
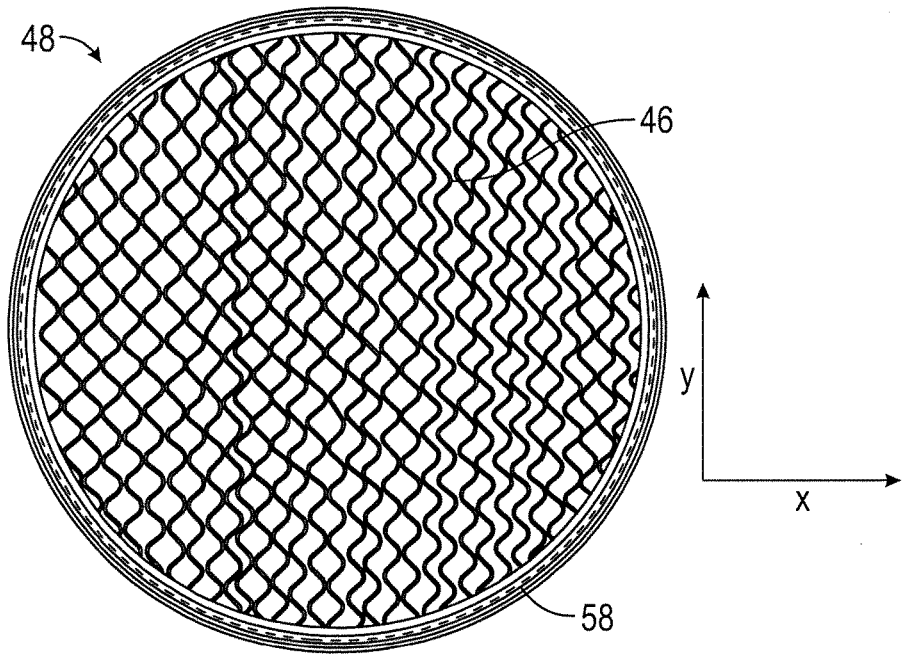
FIG. 2A is a front view of a herringbone substrate used in the inlet portion of an exhaust gas mixer.
Figure 2B:
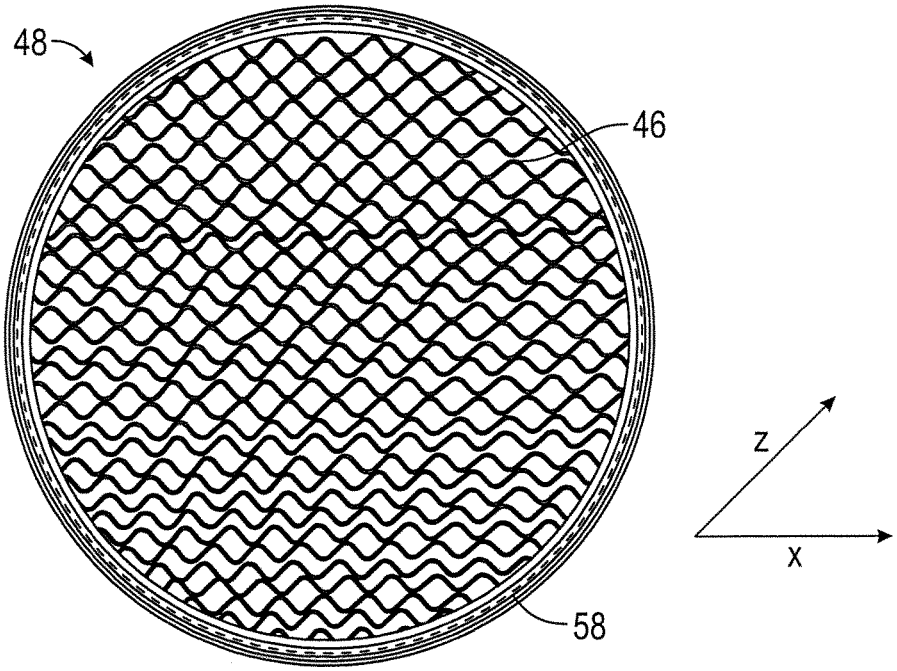
FIG. 2B is a front view of a herringbone substrate used in the outlet portion of an exhaust gas mixer.
Figure 3:
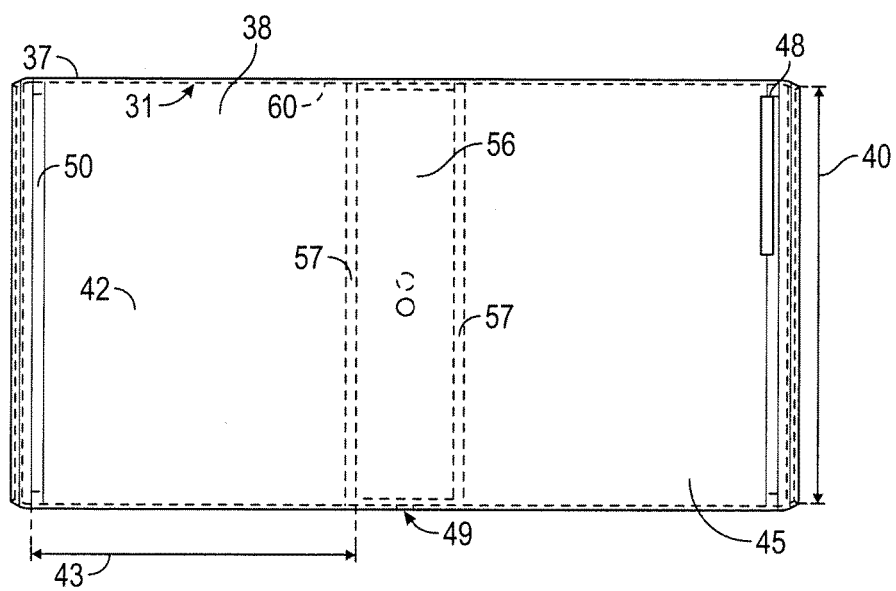
FIG. 3 is a schematic representation of the side view of an exhaust gas mixer.
Figure 4:
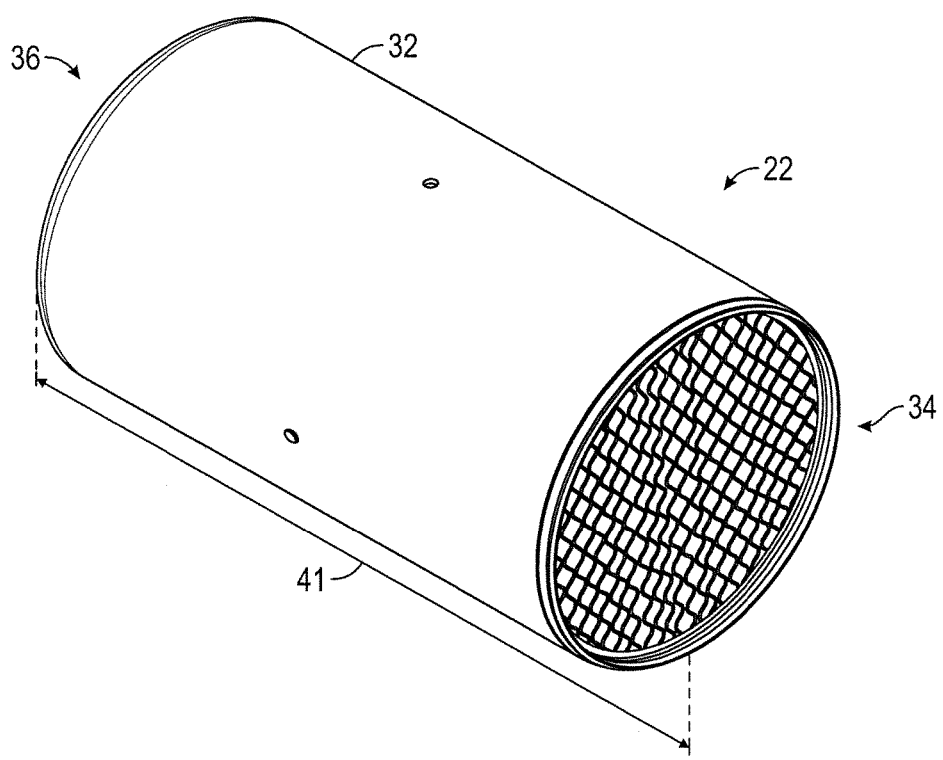
FIG. 4 is a perspective view of one embodiment of an exhaust gas mixer.

As seen in FIGS. 2A and 2B, the exhaust gas substrates are oriented in the body such that the herringbone configuration of the inlet substrate shown in FIG. 2A is orientated 90 degrees out of orientation of the herringbone configuration of the outlet exhaust gas substrate shown in FIG. 2B. In this manner, the exhaust gas stream enters the exhaust gas mixer inlet and as it passes through the herringbone substrate, it is caused to swirl and mix in the X-Y plane. The exhaust gas stream then is drawn through the low pressure zone, and encounters the outlet exhaust substrate which is oriented 90 degrees out of orientation with the inlet exhaust gas substrate. Passing through the outlet exhaust gas substrate mixer causes turbulence mix and swirl in the X-Z plane, thereby imparting maximum mixing to the exhaust gas stream. If the $NO_x$ sensor has sensed a level of $NO_x$ in the exhaust gas stream that requires the injection of a quantity of DEF upstream to the exhaust gas mixer, the DEF is also mixed with the exhaust gas stream. This mixing permits a smaller amount of DEF to be injected into the exhaust gas stream to effect the same chemical reactions as the exhaust gas stream passes through the SCR than the larger amount of DEF that was necessary to be injected into the exhaust stream without the use of the exhaust gas mixer as described.

The words used to explain the embodiment(s) shown are understood to be words of description and are not words of limitation. While an embodiment has been described, it is apparent to those skilled in the art that many variations and modifications are possible without departing from the scope and spirit of the invention as set forth in the appended claims.

What is claimed as new and desired to be protected by Letters Patent of the United States is:

1. An exhaust gas mixer to impart swirl, mix and turbulence in an exhaust stream of an internal combustion engine, comprising:
   a body having opposed first and second ends in spaced apart relation to each other and separated by a low pressure zone, said first end having an inlet and said second end having an outlet, said body having an inner surface and an outer surface extending substantially unbroken between said opposed first and second ends to define an interior; said inlet and outlet each having a diameter substantially equal to an exhaust conduit diameter;
   said body further equipped at its first end with a first exhaust substrate having a herring bone configuration and a second exhaust substrate having a herring bone configuration at its second end;
   said first and second exhaust substrate separated by said low pressure zone, and positioned out of orientation relative to each other such that one substrate imparts turbulence and swirl to an exhaust gas stream in an X-Y plane, and another substrate imparts turbulence and swirl to the exhaust gas stream in an X-Z plane.

2. The exhaust gas mixer of claim 1, wherein each said exhaust substrates is formed of a continuous corrugated foil metal catalyst substrate having a length and a width that is fan folded at predetermined junctions into a fan folded corrugated continuous foil shape, said shape having at least two layers of opposed corrugated foil in facing relation to each other; said corrugations in each layer position relative to each other to form a substantially consistent pattern between said layers, said shape having a length and a face; said substrate having a length and a face, each said substrate length extending from said inlet or said outlet to said low pressure zone.

3. A exhaust system for an internal combustion engine, comprising
   an exhaust stream conduit having a length with an inlet and an outlet, an exhaust gas stream sensor, a particulate filter having connected at an inlet to said conduit and having an outlet; and
   an exhaust gas mixer having a body having opposed first and second ends in spaced apart relation to each other and separated by a low pressure zone, said first end having an inlet and said second end having an outlet, said body having an inner surface and an outer surface extending substantially unbroken between said opposed first and second ends to define an interior; said inlet and outlet each having a diameter substantially equal to an exhaust conduit diameter;

said body further equipped at its first end with a first exhaust substrate having a herring bone configuration and a second exhaust substrate having a herring bone configuration at its second end;

said first and second exhaust substrate separated by said low pressure zone, and positioned out of orientation relative to each other such that one substrate imparts turbulence, mix and swirl to an exhaust gas stream in an X-Y plane, and another substrate imparts turbulence, mix and swirl to the exhaust gas stream in an X-Z plane.

4. The exhaust system of claim 3, wherein said particulate filter is a diesel particulate filter.

5. The exhaust system of claim 4, further including a diesel exhaust fluid supply fluidly connected to said exhaust conduit after said diesel particulate filter outlet; and a selective catalyst reduction unit.

* * * * *